United States Patent [19]

Endo et al.

[11] Patent Number: 4,478,775
[45] Date of Patent: Oct. 23, 1984

[54] METHOD OF EXTRUDING AND SHAPING THERMOPLASTIC MATERIAL

[75] Inventors: Gen Endo, Moriyama; Hirokazu Hori, Shiga; Yoshihiro Kawada, Shiga; Junzo Sakai, Shiga, all of Japan

[73] Assignee: Sekisui Kagaku Kogyo Kabushiki Kaisha, Osaka, Japan

[21] Appl. No.: 376,042

[22] Filed: May 7, 1982

Related U.S. Application Data

[63] Continuation of Ser. No. 135,023, Mar. 28, 1980, abandoned.

[30] Foreign Application Priority Data

Apr. 5, 1979 [JP]  Japan .................................. 54-41694

[51] Int. Cl.³ .............................................. B29F 3/06
[52] U.S. Cl. .................................. 264/40.3; 264/40.1; 264/40.4
[58] Field of Search ...................... 264/40.3, 40.1, 40.4

[56] References Cited

U.S. PATENT DOCUMENTS 4,171,193 10/1969 Rahlfs .................................. 425/71
4,209,476  6/1980 Harris .................................. 264/40.4

FOREIGN PATENT DOCUMENTS 548666  1/1977  U.S.S.R. ............................. 264/40.3

Primary Examiner—Donald E. Czaja
Assistant Examiner—Mary A. Becker
Attorney, Agent, or Firm—Jordan and Hamburg

[57] ABSTRACT

A method of extruding and shaping thermoplastic material in which a constant amount of thermoplastic material is continuously fed from a screw extruder to a die by means of a metering pump. The extruder is arranged to continuously receive a constant amount of the thermoplastic material. The metering pump is adjusted to the correct rotational frequency to maintain the pressure of the molten thermoplastic material between the extruder and the metering pump within a predetermined range.

10 Claims, 5 Drawing Figures

METHOD OF EXTRUDING AND SHAPING THERMOPLASTIC MATERIAL

This is a continuation, of applicaton Ser. No. 135,023, filed Mar. 28, 1980 now abandoned.

BACKGROUND OF THE INVENTION

The present invention relates to a method of extruding and shaping thermoplastic material comprising the steps of continuously extruding a constant amount of molten thermoplastic material from a screw extruder, and continuously feeding a constant amount of the molten thermoplastic material extruded from the extruder to a die by means of a metering pump.

Molten thermoplastic material may come out of the extruder in varying amounts and cause what is known as surging owing to variations in plasticity of the material, the internal pressure of the extruder and the like. The above method is intended to check such a phenomenon affecting the shape and size of products extruded from the die by utilizing the measuring pump. A method of this nature proposed in the past is illustrated in FIG. 5, according to which pressure difference between positions upstream and downstream of a metering pump 101 is detected by sensors 102a, 102b and then the rotational frequency of a screw 103a of an extruder 103 is adjusted by a control device 104 to diminish deviation of the detected pressure difference from a predetermined value. However, a change of the rotational frequency of the screw will change the temperature within the extruder 103 which results in a change of the melting temperature of the plastic material for example. These latter changes can occur without any fixed relationship with the change of the rotational frequency of the screw 103a, and as a result make the pressure difference across the measuring pump 101 unstable and greatly deviated from the predetermined value. Therefore, from the point of view of control technique it is extremely difficult or impossible to provide a sufficient checking of surging appearing on products dispensed from a die 105 to meet practical requirements. Incidentally, FIG. 5 includes a motor 106 for driving the screw which is controlled by a control device 104 and a feeder 107 for feeding the thermoplastic material.

SUMMARY OF THE INVENTON

In veiw of the above state of the art, the object of the present invention is to provide a method of checking surging more easily and reliably and yet with the accuracy that meets practical requirements.

The method of extruding and shaping thermoplastic material according to the present invention is as described in the introductory part hereof and is characterized by further comprising the steps of continuously feeding a constant amount of the thermoplastic material to the extruder by means of a constant volume feeder, detecting pressure of the molten thermoplastec material between the extruder and the measuring pump, and adjusting rotational frequency of the measuring pump to diminish deviation of the detected pressure value from a predetermined pressure value.

Where, as described, the rotational frequency of the measuring pump is adjusted, only negligible thermal changes result from variations in the rotational frequency of the pump and the changes in the detected pressure accompanying the changes in the rotational frequency of the pump are regular and sharp defined. Therefore, surging is unlikely to occur and, if it does occur, it is effectively checked in a short time. Besides the invention facilitates positive checking of surging in regard of control techniques. Thus an improvement has been made on uniformity of products coming out of the die, from the practical point of view.

Other objects and advantages or the present invention will become apparent from the following description.

DETAILED DESCRIPTION OF THE PREFERRED EMBODIMENTS

Figure 1:
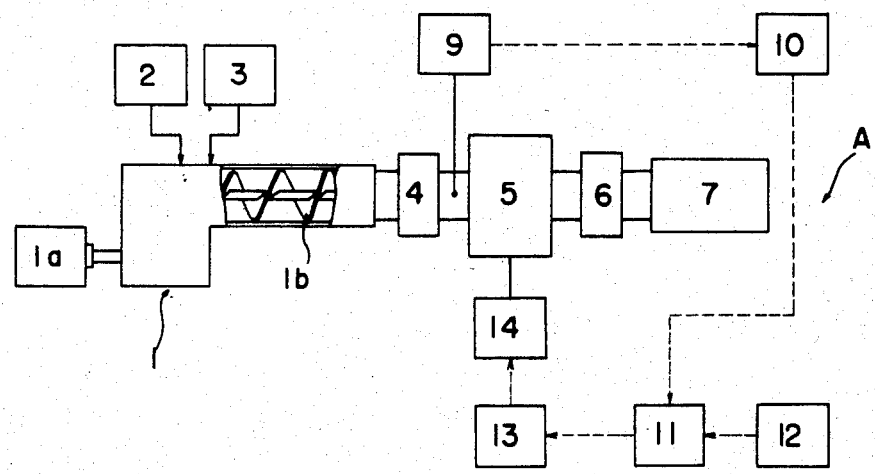
FIG. 1 is a block diagram of an apparatus employing the method of this invention.
Figure 5:
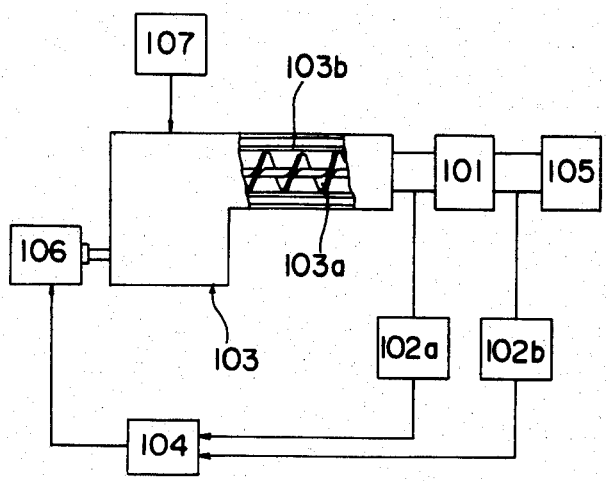
FIG. 5 is a block diagram of a prior art apparatus.

A twin screw extruder 1 continuously receives a constant amount of thermoplastic material from a constant volume feeder 2 and a constant amount of liquid such as plasticizer from a further constant volume feeder 3. By rotating a screw 1b by means of a prime mover 1a comprising an electric motor for example, the thermoplastic material is heated and turned into molten state under a shearing action of the screw 1b. The thermoplastic material is mixed with the liquid there at the same time. Then the extruder 1 continuously extruder a constant amount of the molten thermoplastic material through a filter 4 to a measuring pump 5. The pump 5 continuously sends a constant amount of the molten thermoplastic material to a die 7 through a filter 6. The die 7 turns the material into plastic products having predetermined shape and size.

A pressure sensor 9 is mounted between the extruder 1 and the measuring pump 5 and downstream of the filter 4 to detect the pressure of the molten thermoplastic material. A detected pressure is converted by a convertor 10 into an electric signal which is fed to a regulator 11. The regulator 11 is adapted to detect a difference between the detected pressure and a predetermined pressure provided by a pressure setting device 12 and to transmit a signal to a change speed device 13. The change speed device 13 is adapted to control the speed of a prime mover 14 such as an electric motor connected to the measuring pump 5. Thus the pump 5 is automatically adjusted to the right rotational frequency to check surging on products coming out of the die 7.

The extruder 1 may be chosen from various types such as a single screw type and a multiple screw type. The screw 1b may be arranged rotatable at variable rates.

The constant volume feeder 2 for feeding the thermoplastic material may comprise a screw feeder, a rotary feeder, a bable feeder or any other types and its specific construction may be varied.

The constant volume feeder 3 for feeding the liquid may comprise a gear pump, a plunger pump, a diaphragm type pump or any other types. It is possible to dispense with this feeder 3.

The measuring pump 5 may be chosen from a rotary pump of gear type, vane type or other, a friction pump of screw type or other, a plunger pump, and various other pumps. The specific construction of the change speed device 13 for the pump 5 is variable.

The products shaped in the die 7 include piping, sheet, film and many others. These products may be forwarded to a further stage of process for laminate coating or other treatment.

The pressure sensor 9 may be electric, hydraulic, mechanical or various other types.

The described arrangement for automatically adjusting the rotational frequency of the measuring pump is herein generally termed automatic control mechanism A, and its specific construction and adjusting operation are variable in many ways.

It is desirable to employ a PID system and an upper and lower limits setting system for operating the automatic control mechanism A in order that products coming out of the die have uniform quality. The upper and lower limits setting system is such that the speed of the metering pump 5 is increased if the detected pressure value is greater than a predetermined upper limit and is reduced if the detected value is smaller than a predetermined lower limit.

It is possible to omit the automatic control mechanism A and provide means to indicate the pressure value detected by the pressure sensor 9 instead in order to adjust the metering pump 5 manually. In this case the upper and lower limits setting system is best suited for the operation.

The metering pump 5 may be controlled by detecting a difference between pressures upstream and downstream of the pump 5 and equalizing these pressures.

Figure 2:
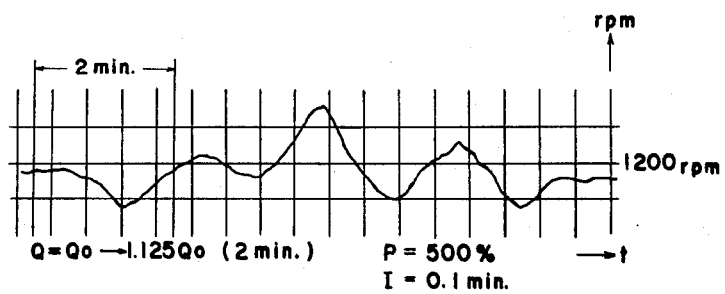
FIGS. 2 to 4 are graphs showing test results.
Figure 3:
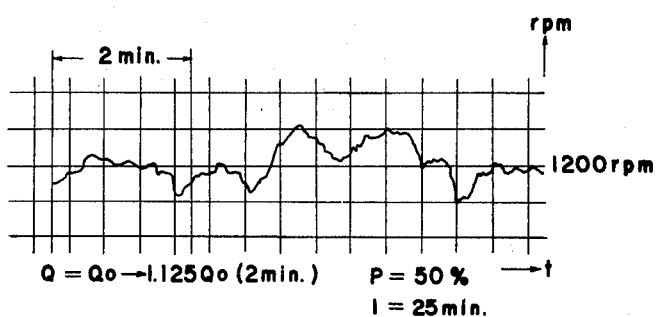
Figure 4:
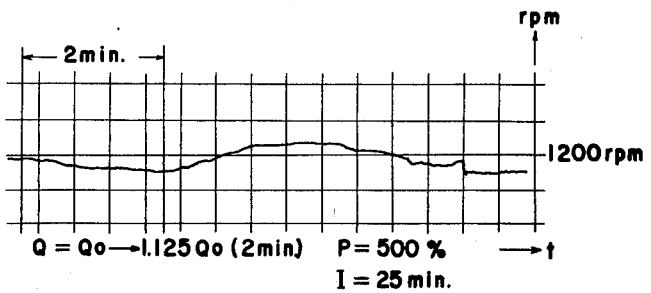

FIGS. 2, 3 and 4 show test results of the PID control system. In the tests, the rotational frequency of the metering pump 5 was adjusted by proportional control P and integral control I set in varied ways.

Each of these Figures illustrates the PID control wherein a quantity Q which is 12.5 percent increase of fixed quantity Qo is extruded for two minutes. In FIG. 2, the time factor for the integral control I is set small (0.1 min.) whereby the rotational frequency of the measuring pump 5 is regulated with good sensitivity in response to pressure variations on the suction side thereof. In FIG. 3 the proportional control P is set at a small constant (50%) which again provides sensitive controlling. In FIG. 4 the proportional control P is set at a large constant (500%) and the integral control I is set for a longer time (25 min.), and this shows a gentle controlling of the rotational frequency.

The control as shown in FIG. 4 can diminish variation in the rotational frequency of the measuring pump 5 to provide volumetric constancy, and when plate-like products are intended little unevenness will result. This control therefore has advantage over those of FIGS. 2 and 3.

It may be added in the interest of reference that in the control as shown in FIG. 4 twenty product pieces coming out of the die every thirty seconds have been measured and the value of volumetric uniformity ($3\sigma/\chi$) (where $\sigma$ is a standard deviation and $\chi$ is an average value) has been ±2 percent.

We claim:

1. A method of extruding thermoplastic material comprising
   (A) continuously feeding a substantially constant amount of said thermoplastic material from a constant volume feeder to a twin screw extruder,
   (B) continuously extruding a substantially constant amount of said thermoplastic material through said twin screw extruder,
   (C) continuously feeding a substantially constant amount of said thermoplastic material extruded through said twin screw extruder to a die by means of a metering pump,
   (D) measuring pressure of said thermoplastic material between said twin screw extruder and said metering pump, and
   (E) adjusting rotational frequency of only said metering pump with a proportional-integral-derivative (PID) system to diminish deviation of said measured pressure from a predetermined pressure value while rotation of said twin screw extruder is maintained constant.

2. The method of claim 1 in which said thermoplastic material is (A) continuously fed from a screw feeder.

3. The method of claim 1 in which said thermoplastic material is (A) continuously fed from a rotary feeder.

4. The method of claim 1 additionally comprising the step of (A') continuously feeding a constant amount of liquid from an additional constant volume feeder to said extruder.

5. The method of claim 4 in which (A') plasticizer is continuously fed from said additional constant volume feeder.

6. The method of claim 4 in which said additional constant volume feeder (A') is selected from one of a gear pump feeder, a plunger pump feeder, and a diaphragm pump feeder.

7. The method of claim 1 in which said metering pump (C) is selected from one of a gear rotary pump, a vane pump, a friction screw pump, and a plunger pump.

8. The method of claim 1 in which (D) pressure is measured by a sensor selected from one of an electric sensor, an hydraulic sensor, and a mechanical sensor.

9. The method of claim 1 in which (D) said pressure is measured against an upper limit and a lower limit.

10. The method of claim 1 which produces an extruded thermoplastic material having a volumetric uniformity ($3\sigma/\chi$) where $\sigma$ is a standard deviation and $\chi$ an average value, or between about ±2 percent.

* * * * *